United States Patent [19]

McLoughlin

[11] 4,439,510
[45] Mar. 27, 1984

[54] METHOD FOR THE PRODUCTION OF DRY TONER FOR ELECTROSTATOGRAPHY USING INTERFACIAL POLYCONDENSATION TECHNIQUES

[75] Inventor: Arthur R. McLoughlin, Adelaide, Australia

[73] Assignee: Research Holdings Pty Limited, Eastwood, Australia

[21] Appl. No.: 414,321

[22] PCT Filed: Dec. 3, 1981

[86] PCT No.: PCT/AU81/00179
§ 371 Date: Aug. 10, 1982
§ 102(e) Date: Aug. 10, 1982

[87] PCT Pub. No.: WO82/02005
PCT Pub. Date: Jun. 24, 1982

[30] Foreign Application Priority Data
Dec. 11, 1980 [AU] Australia ............................ PE6894

[51] Int. Cl.³ .............................................. G03G 9/16

[52] U.S. Cl. .................................... 430/137; 430/109; 430/111; 430/138; 428/402.2; 428/402.24; 427/221; 427/385.5

[58] Field of Search ............... 430/111, 137, 109, 138; 252/316; 428/402.2, 402.21, 402.24

[56] References Cited

U.S. PATENT DOCUMENTS 3,745,118  7/1973  Brynko ........................... 430/137 X
4,016,099  4/1977  Wellman ............................ 430/137

Primary Examiner—John D. Welsh
Attorney, Agent, or Firm—Kinzer, Plyer, Dorn & McEachran

[57] ABSTRACT

Disclosed is a method of preparing electroscopic marking particles comprising encapsulating an ink using an aqueous phase emulsion solution including an albumin stabilizer which becomes hydrophobic during processing to give relatively dry, non-tacky particles.

9 Claims, No Drawings

METHOD FOR THE PRODUCTION OF DRY TONER FOR ELECTROSTATOGRAPHY USING INTERFACIAL POLYCONDENSATION TECHNIQUES

BACKGROUND OF THE INVENTION

It is well known to tone electrostatic latent images contained on photoconductive or dielectric surfaces by application thereto of electroscopic marking particles. It is also known to have electroscopic marking particles in dry form which can be fixed by pressure onto the photoconductor which may comprise a sheet of paper coated with photoconductive Zinc Oxide in a resinous binder or which electroscopic marking particles can be transferred from the photoconductor onto plain paper and affixed thereto by pressure. Electroscopic marking particles which can be fixed by pressure are generally referred to as pressure fixing dry toner.

Pressure fixing dry toner compositions of encapsulated and non-encapsulated type are also well known. Encapsulated toners are disclosed for instance in U.S. Pat. Nos. 3,080,250, 3,080,251, 3,080,318, 3,893,032 and 3,893,933. Pressure fixing toners of non-encapsulated type are disclosed for instance in U.S. Pat. Nos. 3,788,994, 3,804,764, 3,873,325, 3,903,320 and 3,925,219.

Encapsulated dry toners of the prior art methods disclosed have inherent limitations with regards particle size control, quantity and type of coloring matter which can be encapsulated, capsular shell thickness and inertness.

In each of the prior art disclosures the fixing pressures disclosed are very high, being generally within the range 200-500 pounds/lineal inch. In the past it was considered that pressure fixing toners were of necessity formulated to require high fixing pressure in order that such materials should possess suitable physical characteristics for normal handling purposes.

In our co-pending U.S. Pat. application Ser. No. 958,009, dated Nov. 6, 1978, abandoned (based on Australian Pat. Application No. PD2374/77 dated Nov. 10, 1977), entitled "Microcapsular Electroscopic Marking Particles", there are disclosed electroscopic marking particles that is dry toner material in the form of microcapsules of controlled size wherein high intensity coloring matter can be encapsulated within an inert capsular shell and wherein such capsular shell allows fixing by relatively low pressure yet permits easy handling of the dry toner material. Such electroscopic marking particles are prepared in the form of microcapsules following in general the encapsulation teachings of H. Ruus as disclosed in U.S. Pat. No. 3,429,827 and G. E. Maalouf as disclosed in U.S. Pat. No. 4,000,087, each of which is incorporated herein by reference. The technique disclosed therein is generally referred to as interfacial polycondensation, in which process a non-aqueous phase containing one reacting material is emulsified in an aqueous phase containing a second reacting material. Reaction is arranged to occur under constant agitation to produce micro droplets of the non-aqueous phase encapsulated in a shell comprising the reaction product formed at the phase interface, such shell probably comprising a substantially impervious polyamide or other polymeric compound.

The microcapsular electroscopic marking particles in accordance with our co-pending Application comprise colored encapsualted pressure fixable substance contained within a rupturable shell and a residue layer over such shell.

The substance to be encapsulated comprises in essence as ink, a first reactive substance and a carrier for said ink and said first reactive substance.

The ink comprises coloring matter which may be organic or inorganic pigment, magnetite or ferrite or other magnetizable substances, dyes which may be present in particulate state or in dissolved state or in absorbed or adsorbed state associated with the pigment or magnetizable substance, binder material for said coloring matter such as mineral and vegetable oils, natural and synthetic resins, bituminous substances, rubber or other elastomers, waxes, plasticizers, aliphatic or aromatic hydrocarbon solvents, antioxidants, viscosity modifying agents, metallic soaps, alkyl aryl compounds, phosphatides such as lecithin, bitumens or asphalts, sulphur containing compounds such as sulphosuccinates and such like substances.

The carrier medium for said ink may comprise a solvent or a plasticizer such as for instance dibutyl phthalate or the like substance having dispersed therein said ink and having dissolved therein said first reactive substance.

To form for instance a polyamide shell in accordance with the interfacial polycondensation process there is first prepared a water phase that is an aqueous solution of an emulsion stabilizer such as polyvinyl alcohol or hydroxy ethyl cellulose or cellulose gum and the like and then in such solution the aforementioned substance to be encapsulated in accordance with this invention is dispersed to form an emulsion. Following such emulsification of said substance to be encapsulated the second reactive substance which is an amine containing substance such as diethylene triamine or the like in aqueous solution which may also contain a pH stabilizer such as sodium carbonate or the like is added to such emulsion under agitation and such agitation is continued for some time until a polycondensation product that is polyamide is formed as a shell at the interface between the emulsified droplets or globules of the substance to be encapsulated and said water phase due to reaction between said first and second reactive substances contained in said substance to be encapsulated and said water phase, respectively.

Said water phase may also contain therein in dispersed or dissolved state protective colloids and surface active agents of the anionic, cationic or nonionic type and the like, which substances may absorb onto or be absorbed by or react in part with the shell.

Upon completion of the interfacial polycondensation process there is formed an aqueous slurry containing therein in suspended state microcapsules and in dissolved or dispersed state at least part of the aforementioned emulsion stabilizer, protective colloid and surface active agent. Such slurry can be spray dried to form discrete capsular particles which contain on the outer shell wall in dry form and adsorbed thereto or absorbed thereby or in part reacted therewith a residue layer consisting of said emulsion stablilizer, protective colloid and surface active agent, such dry discrete capsular particles or agglomerates thereof constituting the electroscopic marking particles.

The pressure required to rupture such microcapsular electroscopic marking particles depends mainly on the size of the microcapsules and on the thickness and robustness of the shell. Relatively large and thin shell capsules are easier to rupture by pressure than those of smaller size, as a general rule. The capsule size can be precisely controlled by the selection of appropriate speed of stirring or mixing during the aforementioned step of emulsification and/or of the duration of such step of emulsification and it is also possible to control particle size additionally by varying the proportion of the aforementioned emulsion stabilizer in the aqueous solution that is in the water phase as well as by varying the proportion of the substance to be encapsulated when emulsifying in the water phase. The robustness of the capsular shell can be precisely controlled by varying the proportion of the two aforementioned reactive substances in relation to each other and furthermore the robustness of the shell can also be varied by having a single shell or by having additional inner shells or shell walls. An additional inner shell or shell wall of a polyamide shell can be formed by for instance an epichlorhydrin polymer which for this purpose can be incorporated in dissolved state with the aforementioned carrier medium dibutyl phthalate together with the ink and the first reactive substance.

The dry toner powder material in accordance with our co-pending Application is characterised by forming high color density images as the interfacial polycondensation process lends itself admirably to the inclusion of substantial quantity of coloring matter into microcapsules produced by such process. In addition to the incorporation of pigments and dyes into the ink which forms part of the encapsulated substance it is also possible to include dyes in dissolved or dispersed state, where such dyes can be dissolved or dispersed in the binder materials for the pigment as previously listed, in the carrier medium such as dibutyl phthlate and in the epichlorhydrin polymers employed for the formation of additional shells or shell walls as previously disclosed. Furthermore dyes can be included in the aqueous phase together with the emulsion stabilizer where upon drying such dye is found to be contained on the outside of the capsular shell and bonded thereto by said emulsion stabilizer. It is also possible to have dyes adsorbed onto the pigment prior to incorporation thereof in said ink in which case such pigment is dyed firstly by milling or mixing in a dye solution and then dried prior to inclusion into the ink with the binder materials.

The pigments and dyes referred to in the foregoing must be so selected that they do not react in any way with the aforementioned two reactive substances and in particular such dyes must not contain free amine groups which may react with the first reactive substance acid chloride.

In those cases where water dispersible or hydrophilic pigments such as magnetite, ferrite, magnetizable materials and other such like substances are included in the encapsulated substance it is necessary to protect such materials from interaction with the aforementioned first reactive substance and render such materials oil dispersible or oleophilic in order to prevent migration of such particulate matter from the oil phase of the ink in the substance to be encapsulated or from the carrier medium into the aqueous outer phase as such migration precludes effective encapsulation.

Such hydrophilic particulate substances can be protected as well as rendered oleophilic by for instance treating or coating the particle surface with silicones either by the so-called fuming process or by wetting or grinding the particles in a solution of silicones followed by removing the solvent, or by coating the particles by any known method of grinding or dispersing in a solution or hot melt of materials such as natural and synthetic waxes such as polyethylene, oils, synthetic resins such as ketone resins, epichlorhydrin polymers, urethanes, polycarbonates, phthalates, acrylics and styrenes, where some of such materials and in particular the acrylics and styrenes can be applied in substantially monomeric form and subsequently polymerized on the particle surface by known methods.

The microcapsular electroscopic marking particles in accordance with our co-pending Application form upon drying a free flowing powder which can be readily employed as toner material. However for the purposes of handling, packaging and feeding as well as recycling in certain high speed toner applicators it has been found advantageous to incorporate with the microcapsules substances such as colloidal silica, aluminium silicate, calcium silicate and such like flow improvers. Such flow improving substances can be admixed with the dry microcapsules or alternatively such flow improving substances can be dispersed in the aqueous phase before or after the substance to be encapsulated is emulsified therein and upon spray drying the aqueous slurry in such cases the flow improving substances become evenly distributed between the dry microcapsules and in some instances at least in part bonded to the outer shell surface by the dry emulsion stabilizer.

While the shell of such microcapsular electroscopic marking particles is not affected by environmental conditions, certain emulsion stabilizers such as polyvinyal alcohol which remain on the shell surface upon drying are somewhat affected by moisture and thus in high speed toner applicators operating under particularly high relative humidity conditions it is desirable to further improve the flow properties of the dry toner material by rendering the residual emulsion stabilizer water insoluble which for instance in the case of polyvinyl alcohol can be attained by adding to the aqueous slurry upon completion of the encapsulation process whilst agitating same for some time a water soluble resin such as a melamine resin which reacts with polyvinyl alcohol and renders same water insoluble. Residual emulsion stabilizer or protective colloids or surface active agents can of course be substantially reduced in quantity by washing the microcapsules with water prior to insolubilizing the emulsion stabilizer and if so desired also after insolubilization in order to remove traces of unreacted materials.

The dry toner powder material consisting of microcapsular electroscopic marking particles in accordance with out co-pending Application can be of polarity suitable for toning of latent images formed by positive or negative electrostatic charges, as desired. Such dry toner powder can be admixed with iron filings for operation in the well known magnetic brush applicators, or with other carrier particles for operation in other toner applicators for instance of the cascade type as is well known. Alternatively in those instances where the encapsulated substance contains magnetite or ferrite or other magnetizable material such dry powder can be employed as a single component toner with a multi magnet roller applicator as is also well known. The dry powder can be applied to tone directly latent images contained on a dielectric or photoconductive surface such as zinc oxide coated paper and fixed thereto or such powder can be employed to tone latent images contained on reusable photoconductors followed by transfer onto plain paper and fixing thereto.

In all instances the toner material can be pressure fixed to the final surface by for instance passage through the nip of a pair of pressure rollers which may be heated if so desired where the pressure applied between such rollers can be of lower order than than required for pressure fixing toners of the prior art.

It will be noted that the marking particles produced in accordance with our co-pending Application upon drying contain on their surface some quantity of the emulsion stabilizer such as polyvinyl alcohol. To improve the flow properties of such particles under high relative humidity conditions it is necessary to reduce the quantity of such polyvinyl alcohol to a minimum by repeated washing of the particles in the slurry before spray drying followed by reacting the residual polyvinyl alcohol with a water soluble resin such as a melamine resin to render the polyvinyl alcohol water insoluble. Such repeated washing of the particles in slurry and the following step of reaction requiring agitation of the slurry for about 24 hours are time consuming process steps and complicate production of the toner material.

SUMMARY OF THE INVENTION

It is the object of the present invention to simplify the production of microcapsular electroscopic marking particles in accordance with our co-pending Application by employing albumin as emulsion stabilizer whereby the need prior to spray drying to repeatedly wash the particles in the slurry and then to insolubilize residual emulsion stabilizer thereon by a reaction process under agitation is eliminated.

DESCRIPTION OF THE INVENTION

In accordance with the present invention electroscopic marking particles are prepared by the interfacial polycondensation encapsulation process substantially as disclosed in our co-pending Application except that instead of polyvinyl alcohol and such like materials albumin is employed as the emulsion stabilizer.

We have found surprisingly that in the interfacial polycondensation process albumin at very low concentrations is a very efficient emulsion stabilizer for the substance to be encapsulated. Particularly in stabilizing the emulsion of the materials to be encapsulated for the production of electroscopic marking particles we have found that for the same emulsification effect albumin can be used at only 1/5th to 1/25th of polyvinyl alcohol concentration by weight dissolved in water. The concentration of the albumin emulsion stabilizer can be selected at least in part to control the particle or globule size of the substance to be emulsified.

The capsule slurry prepared with albumin as emulsion stabilizer can be spray dried without washing the particles to remove residual albumin. The albumin in the form used as emulsion stabilizer is hydrophilic and water soluble. At temperatures around and above 100 deg. C. albumin becomes denatured and is converted to a water insoluble and hydrophobic form.

Thus we have found that when albumin is used as the emulsion stabilizer there is no need prior to spray drying to insolubilize the albumin because the spray drying operation itself, which is carried out at temperatures well above 100 deg. C., denatures albumin and converts it to a water insoluble and hydrophobic form. Such denatured albumin remaining on the surface of the spray dried particles is present in very low quantities due to the low initial concentration required as emulsion stabilizer and furthermore such denatured albumin is completely non-tacky and thus does not cause particle agglomeration during spray drying nor equipment contamination by adhering to the walls of the spray drying chamber or to other parts.

It will be realized that although the flow properties of the spray dried toner particles in accordance with this invention are per se very good due to the hydrophobic character of the denatured albumin, flow improvers can also be additionally incorporated if so desired substantially as disclosed in our co-pending Application.

Furthermore, if so desired for the purposes mainly of adjusting or modifying the triboelectric properties of the toner, the particles suspended or emulsified in the slurry before spray drying can be washed, and also if so desired the albumin contained on the emulsified particles in such slurry prior to spray drying can be hydrolized or oxidized to further enhance the hydrophobic properties of the spray dried toner particles or of the denatured albumin remaining thereon.

The following Examples will serve to further illustrate the present invention.

EXAMPLE 1

An ink for a pressure fixable core composition was prepared as follows:

Synthetic wax, melting point 170° F., acid number 3–4, saponification number 30–50, Sp.Gr. 0.842: 10.9 grms
Polybutene oil, viscosity at 100° F. 27–33 cs, Sp.Gr. 0.8373: 25.0 grms
Isoparaffinic hydrocarbon, boiling range 208°–242° C., flashpoint 77° C. Sr.Gr. 0.750: 38.5 grms
Carbon black: 8.3 grms
Lecithin: 3.0 grms
Hydrophobic magnetite, oil absorption 40%, axial ratio about 8:1, particle length about 0.35 micron: 20.0 grms were milled in a heated ball mill for 4 hours at a temperature of 91°–93° C.

The first reactive substance terephthaloyl chloride, 2.9 grms was dissolved in the same isoparaffinic hydrocarbon, 1.5 grms and the solution was blended with 50 grms of the previously prepared ink.

An emulsification solution was prepared by dissolving sodium carbonate, 1.7 grms, in water, 65.8 grms, followed by the addition with stirring of spray dried albumin, 0.3 grms. The thus formed solution was further diluted with water, 216 grms, the diluted solution being stirred constantly for about 10 minutes.

The ink containing the first reactive substance together with the emulsification solution at 20° C., was charged into a Waring blender to emulsify the ink in the form of microdroplets in the size range 2–35 microns suspended in the emulsification solution. The emulsification time was 30 seconds.

The second reactive substance diethylene triamine, 1.7 grms was dissolved in distilled water, 23.5 grms, and the solution was stirred into the emulsion. Stirring was continued at slow speed for 2 hours, during which time an interfacial polycondensation reaction took place between the diethylene triamine and the terephthaloyl chloride to form polyamide shells around the ink droplets. The thus formed microcapsules were in a state of suspension in what can be termed as an aqueous slurry containing at least part of the emulsion stabiliser in dissolved state therein.

The slurry was spray dried in a Bowen Spray-Aire laboratory spray drier, feed rate 100 ml/minute, air inlet temperature 200° C., outlet temperature 130° C.

The spray dried microcapsules were found to be free flowing. Scanning Electron Microscope (SEM) examination showed the dried microcapsules to be in the size range 2–35 microns.

The spray dried microcapsules containing about 30–35% by weight magnetite formed electroscopic marking particles and were used as single component magnetic toner with a rotating multi-magnet applicator to tone an electrostatic latent image on a charged and exposed binder type zinc oxide photoconductive recording paper. The toner deposit was subsequently transferred electrostatically to bond paper and fixed thereto by passage through a pair of pressure rollers. The fixing pressure was 100 lbs per lineal inch. (18 kilograms per lineal centimeter).

EXAMPLE 2

The ink of Example 1 was replaced with the following:

Polyethylene wax, softening point 60° C.: 7.2 grms
Polybutene oil, as in Example 1: 12.2 grms
Isoparaffinic hydrocarbon, as in Example 1: 22.8 grms
Lecithin: 2.0 grms
Carbon black: 5.8 grms
Magnetite, as in Example 1: 50.0 grms Emulsification, capsule wall formation by interfacial polycondensation and spray drying were each carried out as in Example 1 to produce spray dried capsules of similar physical characteristics as those of Example 1, but containing a substantially higher magnetite content of about 60%. These microcapsules formed electroscopic marking particles and were used as single component magnetic toner with a rotating multi-magnet applicator to tone an electrostatic latent image on a charged and exposed binder type zinc oxide photoconductive recording paper. The toner deposit was subsequently transferred electrostatically to bond paper and fixed thereto by passage through a pair of pressure rollers. The fixing pressure was 100 lbs. per lineal inch (18 kilograms per lineal centimeter). Residual marking particles on the photoconductive recording member were removed by a second passage of the photoconductive recording paper past the rotating multimagnet applicator.

EXAMPLE 3

Example 1 was repeated, but the albumin was rendered water insoluble prior to spray drying by enzyme catalysed hydrolysis. Alkaline phosphatase, 1% based on albumin content was added to the slurry prior to spray drying. The slurry was warmed to 30° C. and allowed to stand for 2 hours prior to spray drying to hydrolize the albumin.

EXAMPLE 4

Example 3 was repeated, however in this instance the slurry was spray dried immediately after addition of the alkaline phosphatase. The temperature within the spray drier was sufficiently high to cause enzyme catalysed hydrolysis of the albumin.

EXAMPLE 5

Example 1 was repeated, but the albumin was denatured prior to spray drying by the addition to the slurry of 0.5% sodium lauryl sulphate, based on albumin content. The slurry was warmed to 25° C. and allowed to stand for 16 hours to denature the albumin prior to spray drying.

EXAMPLE 6

Example 5 was repeated, with the exception that the slurry was spray dried immediately after addition of the sodium lauryl sulphate. Denaturing of the albumin occurred at the elevated temperature in the spray drier.

EXAMPLES 7 AND 8

The sodium lauryl sulphate of Examples 5 and 6 was replaced with an equal weight of urea.

EXAMPLE 9

The sodium lauryl sulphate of Example 5 was replaced with magnesium sulphate, 50% on total slurry weight.

EXAMPLE 10

Example 1 was repeated, but the albumin was oxidized prior to spray drying by the additon of 1% of 100 volume hydrogen peroxide, based on total slurry weight. The sample was halved, one half being stirred for 4 hours while the second half was spray dried immediately. In each instance the albumin was oxidized.

EXAMPLE 11

Example 10 was repeated, with the exception that the hydrogen peroxide was replaced with 1.5% potassium permanganate and about 1.5% sulphuric acid, based on total slurry weight, to oxidize the albumin. In this instance the standing time for the first half of the sample was 16 hours.

EXAMPLE 12

Example 11 was repeated with the exception that the potassium permanganate was replaced with an equal weight of sodium dichromate.

EXAMPLES 13–22

Each of Examples 3–12 was repeated using the slurry of Example 2.

EXAMPLE 23

An ink for a pressure fixable core composition was prepared as follows:

Synthetic wax, as in Example 1: 10 grms
Polybutene oil, as in Example 1: 50 grms
Isoparaffinic hydrocarbon as in Example 1: 20 grms
Carbon black: 20 grms were milled in an attritor for 2 hours at a temperature of 93° C.

The first reactive substance terephthaloyl chloride, 2.9 grms was dissolved in isoparaffinic hydrocarbon, 1.5 grms and the solution was blended with 50 grms of the previously prepared ink.

An emulsification solution was prepared by dissolving sodium carbonate, 1.7 grms, in water, 65.8 grms, followed by the addition with stirring of spray dried albumin, 0.3 grms. The thus formed solution was further diluted with water, 216 grms, the diluted solution being stirred constantly for about 10 minutes.

The ink containing the first reactive substance and the emulsification solution at 20° C. were charged into a Waring blender to emulsify the ink in the form of microdroplets in the size range of 2-5 microns suspended in the emulsification solution. The emulsification time was 30 seconds.

The second reactive substance diethylene triamine, 1.7 grms was dissolved in distilled water, 23.5 grms, and the solution was stirred into the emulsion. Stirring was continued at slow speed for 2 hours, as in Example 1, to form polyamide shells around the ink droplets.

The slurry was spray dried as in Example 1 to produce dried microcapsules in the size range 2-5 microns.

The dried microcapsules formed electroscopic marking particles and were used as two component developer admixed with magnetizable carrier particles in a magnetic brush applicator to tone a negative electrostatic latent image on a charged and exposed binder type zinc oxide photoconductive recording paper. The image deposit was pressure fixed by passage through a pair of pressure rollers at a pressure of 100 lbs/lineal inch (18 kilogram per lineal centimeter).

EXAMPLES 24-33

Each of Examples 3-12 was repeated using the slurry of Example 23.

EXAMPLE 34

An ink for a pressure fixable core composition was prepared as in Example 1.

The first reactive substance terephthaloyl chloride, 5 grms was dissolved in the same isoparaffinic hydrocarbon, 3 grms and the solution was blended with 50 grms of the previously prepared ink.

An emulsification solution was prepared by dissolving sodium carbonate, 1.7 grms, in water, 65.8 grms, followed by the addition with stirring of spray dried albumin, 0.3 grms. The thus formed solution was further diluted with water, 216 grms, the diluted solution being stirred constantly for about 10 minutes.

The emulsification solution at 20° C. and the ink containing the first reactive substance were charged into a Waring blender to emulsify the ink in the form of microdroplets in the size range 2-35 microns suspended in the emulsification solution. The emulsification time was 30 seconds.

The second reactive substance resorcinol, 2.8 grms, was dissolved in distilled water, 23.5 grms, and the solution was stirred into the emulsion. Stirring was continued at slow speed for 2 hours, during which time an interfacial polycondensation reaction took place between the resorcinol and the terphthaloyl chloride to form polyester shells around the ink droplets.

The slurry was spray dried as in Example 1, the thus produced dried microcapsules forming electroscopic marking particles which were used as single component magnetic toner with a rotating multi-magnet applicator to tone an electrostatic latent image on a charged and exposed selenium photoconductor. The toner deposit was subsequently transferred electrostatically to bond paper and fixed there to by passage through a pair of pressure rollers, as in Example 1.

EXAMPLES 35-44

Each of Examples 3-12 was repeated using microcapsules formed as in Example 34.

EXAMPLE 45

An ink for a pressure fixable core composition was prepared as follows:

Synthetic wax, as in Example 1: 600 grms
Isoparaffinic hydrocarbon, as in Example 1: 2000 grms
Aniline Black, Color Index Number 50,440: 750 grms
Hydrophobic magnetite, as in Example 1: 1000 grms were milled in a heated ball mill for 4 hours at a temperature at 90° C.

The first reactive substance 4, 4' diphenylmethane diisocyanate, 8.6 grms was blended with 50 grms of the previously prepared ink.

An emulsification solution was prepared by dissolving sodium carbonate, 1.7 grms in water 65.8 grms, followed by the addition with stirring of spray dried albumin, 0.3 grms. The thus formed solution was further diluted with water, 216 grms and stirred constantly for about 10 minutes.

The ink containing the first reactive substance, together with the emulsification solution at 20° C., was charged into a Waring blender to emulsify the ink in the form of microdroplets in the size range 2-35 microns suspended in the emulsification solution. The emulsification time was 30 seconds.

The second reactive substance, diethylene triamine, 1.8 grms was dissolved in water, 12.5 grms and the solution was stirred into the emulsion. Stirring was continued at slow speed for about 12 hours, during which time an interfacial polycondensation reaction took place between the 4, 4' diphenylmethane diisocyanate and the diethylene triamine to form polyurea shells around the ink droplets.

The slurry was spray dried as in Example 1 to produce dried microcapsules which were used as a single component magnetic toner as in Example 1.

EXAMPLES 46-55

Each of Examples 3-12 was repeated using microcapsules formed as in Example 45.

It has been found that in some instances the spray dried capsules emit an odour on standing, due to degradation of the residual albumin. Such degradation may be inhibited by adding to the slurry prior to spray drying small quantities of biocide or bactericide materials such as orthophenyl phenol, dichlorophen, para-tert-amyl phenyl, alkyl-aryl-trialkyl ammonium chloride and the like. Such materials are added in quantities of about 0.1-1%, based on albumin content.

There have been disclosed pressure fixable electroscopic marking particles prepared by interfacial polycondensation in the form of microcapsules which upon spray drying form free flowing toner material. The production of such toner material is relatively simple. The toner material has very good flow properties due to the emulsion stabilizer on the surface of toner particles being rendered hydrophobic during or before spray drying. The Examples and the materials given in the foregoing are intenended to be read in the illustrative and not restrictive sense as those skilled in the art of electroscopic toner preparation will be able to adapt the teachings of the present disclosure to other materials without departing from the spirit of the invention.

I claim:
1. A method for the preparation of electroscopic marking particles comprising the steps of blending coloring matter, pressure fixable material and if necessary solvent therefore to form an ink, adding to said ink in dissolved form a first reactive substance and homogenising said first reactive substance with said ink, preparing an aqueous phase emulsification solution containing a water soluble emulsion stabiliser and a pH stabiliser, emulsifying said ink containing said first reactive substance in said emulsification solution in the form of droplets, adding to said emulsion an aqueous solution of a second reactive substance, stirring said emulsion and said aqueous solution of said second reactive substance to allow reaction between said first reactive substance and said second reactive substance to encapsulate said emulsified ink droplets by forming a polymeric shell around said emulsified ink droplets, and spray drying the so formed capsule slurry to produce dry electroscopic marking particles, characterised by said emulsion stabiliser comprising albumin and said albumin being rendered water insoluble before or during said spray drying step.

2. A method for the preparation of electroscopic marking particles as disclosed in claim 1, further characterised by said spray drying operation being carried out at a temperature in excess of 100° C. to render said albumin water insoluble.

3. A method for the preparation of electroscopic marking particles as disclosed in claim 1, further characterised by said albumin being rendered hydrophobic prior to spray drying by enzyme catalysed hydrolysis.

4. A method for the preparation of electroscopic marking particles as disclosed in claim 1, further characterised by said albumin being denatured and thus rendered hydrophobic prior to spray drying.

5. A method for the preparation of electroscopic marking particles as disclosed in claim 1, further characterised by said albumin being oxidised and thus rendered hydrophobic prior to spray drying.

6. A method for the preparation of electroscopic marking particles as disclosed in claim 1, further characterised by said first reactive substance comprising terephthaloyl chloride and said second reactive substance comprising an amine.

7. A method for the preparation of electroscopic marking particles as disclosed in claim 1, further characterised by said first reactive substance comprising terephthaloyl chloride and said second reactive substance comprising resorcinol.

8. A method for the preparation of electroscopic marking particles as disclosed in claim 1, further characterised by said first reactive substance comprising 4, 4' diphenylmethane diisocyanate and said second reactive substance comprising diethylene triamine.

9. A method for the preparation of electroscopic marking particles as disclosed in claim 1, further characterised by said coloring matter being selected from the group carbon black, magnetite and carbon black, and magnetite and aniline black.

* * * * *